US010592058B2

(12) United States Patent
Sugimoto et al.

(10) Patent No.: US 10,592,058 B2
(45) Date of Patent: Mar. 17, 2020

(54) TOUCH PANEL DRIVING DEVICE AND TOUCH PANEL DEVICE

(71) Applicant: Futaba Corporation, Mobara-shi, Chiba-ken (JP)

(72) Inventors: Terukazu Sugimoto, Mobara (JP); Takashi Muguruma, Mobara (JP); Hiroyuki Tanaka, Mobara (JP); Katsumi Takayama, Mobara (JP); Cheng-Che Ho, New Taipei (TW); Fumikazu Omoto, New Taipei (TW)

(73) Assignee: FUTABA CORPORATION, Mobara-Shi, Chiba-Ken (JP)

( * ) Notice: Subject to any disclaimer, the term of this patent is extended or adjusted under 35 U.S.C. 154(b) by 0 days.

(21) Appl. No.: 16/254,689

(22) Filed: Jan. 23, 2019

(65) Prior Publication Data
US 2019/0243483 A1    Aug. 8, 2019

(30) Foreign Application Priority Data

Feb. 7, 2018    (JP) .................................. 2018-020196

(51) Int. Cl.
*G06F 3/044* (2006.01)
*G06F 3/041* (2006.01)

(52) U.S. Cl.
CPC .......... *G06F 3/044* (2013.01); *G06F 3/04166* (2019.05); *G06F 3/0446* (2019.05)

(58) Field of Classification Search
CPC ...... G06F 3/044; G06F 3/0441; G06F 3/0442; G06F 3/0443; G06F 3/0444; G06F 3/0445; G06F 3/0446

See application file for complete search history.

(56) References Cited

U.S. PATENT DOCUMENTS

| 2013/0141372 A1* | 6/2013 | Kang ...................... G06F 3/041 345/173 |
| 2013/0181916 A1* | 7/2013 | Huang .................... G06F 3/044 345/173 |
| 2013/0300690 A1* | 11/2013 | Yang ..................... G06F 3/0416 345/173 |
| 2014/0333575 A1* | 11/2014 | Hu ......................... G06F 3/044 345/174 |

(Continued)

*Primary Examiner* — Dong Hui Liang
(74) *Attorney, Agent, or Firm* — Bacon & Thomas, PLLC

(57) ABSTRACT

A touch panel driving device, for sequentially performing scanning for selecting a pair of adjacent transmission signal lines and a pair of adjacent reception signal lines on a touch panel, includes a reception circuit configured to receive reception signals whose waveforms are changed by a capacitance change caused by an operation from the pair of reception signal lines of the touch panel and generate a detection value for monitoring a touch panel operation. The reception circuit generates the detection value by comparing levels of the reception signals from the reception signal lines while sequentially switching capacitance values of a measurement capacitance unit connected to one of the reception signal lines. The measurement capacitance unit includes capacitance units each forming a certain capacitance value by parallel connection or series connection of capacitors as a capacitance unit forming one capacitance value used for switching the capacitance value of the measurement capacitance unit.

9 Claims, 13 Drawing Sheets

(56) References Cited

U.S. PATENT DOCUMENTS

| | | | |
|---|---|---|---|
| 2014/0368459 A1* | 12/2014 | Lei | G06F 3/044 345/174 |
| 2015/0054777 A1* | 2/2015 | Hashimoto | G06F 3/044 345/174 |
| 2015/0185913 A1* | 7/2015 | Han | G06F 3/044 345/174 |
| 2016/0334905 A1* | 11/2016 | Hu | G06F 3/0416 |
| 2018/0188846 A1* | 7/2018 | Srivastava | G06F 3/0412 |
| 2018/0188847 A1* | 7/2018 | Srivastava | G06F 3/044 |
| 2019/0171314 A1* | 6/2019 | Hamaguchi | G06F 3/0412 |

* cited by examiner

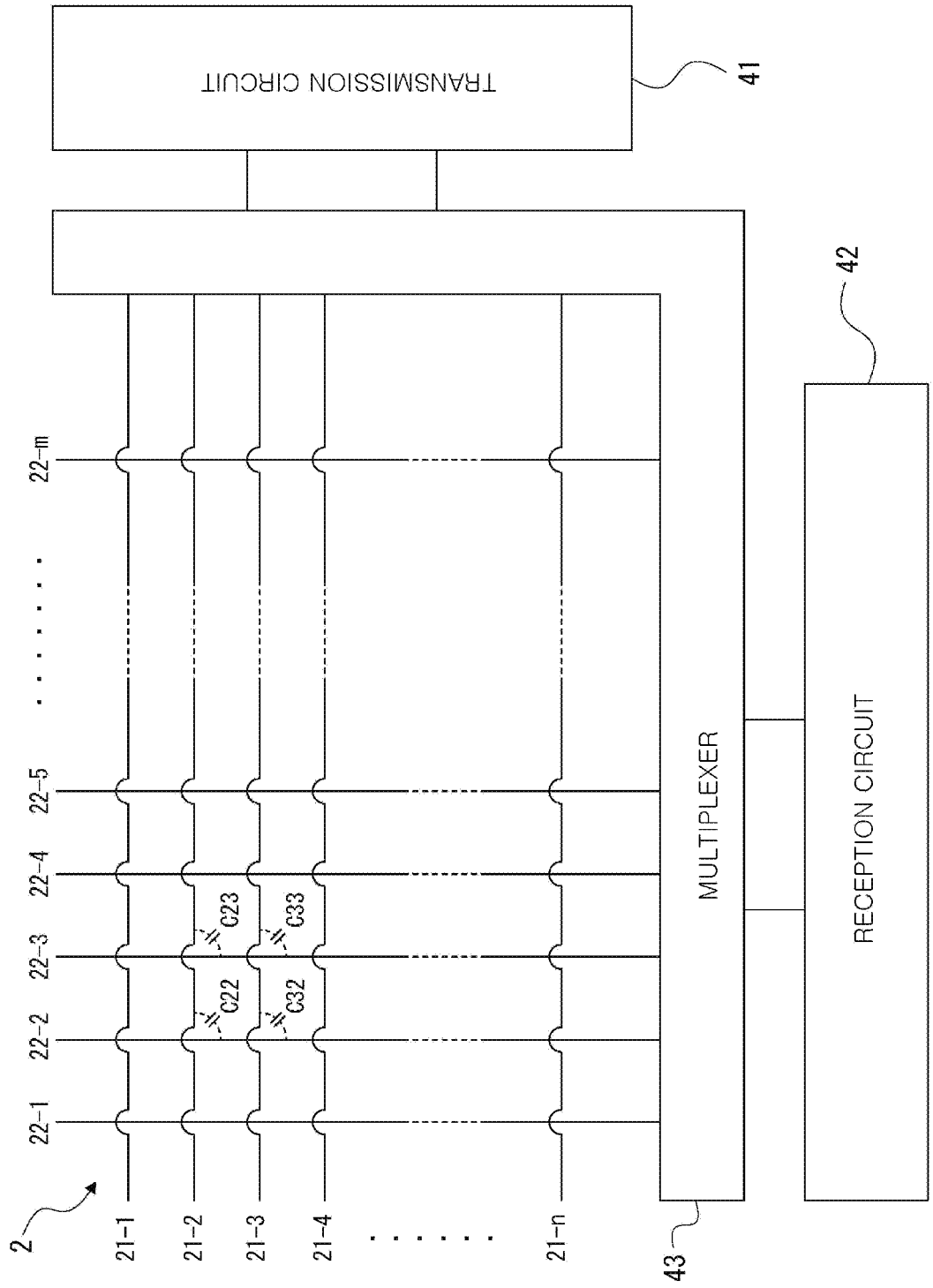

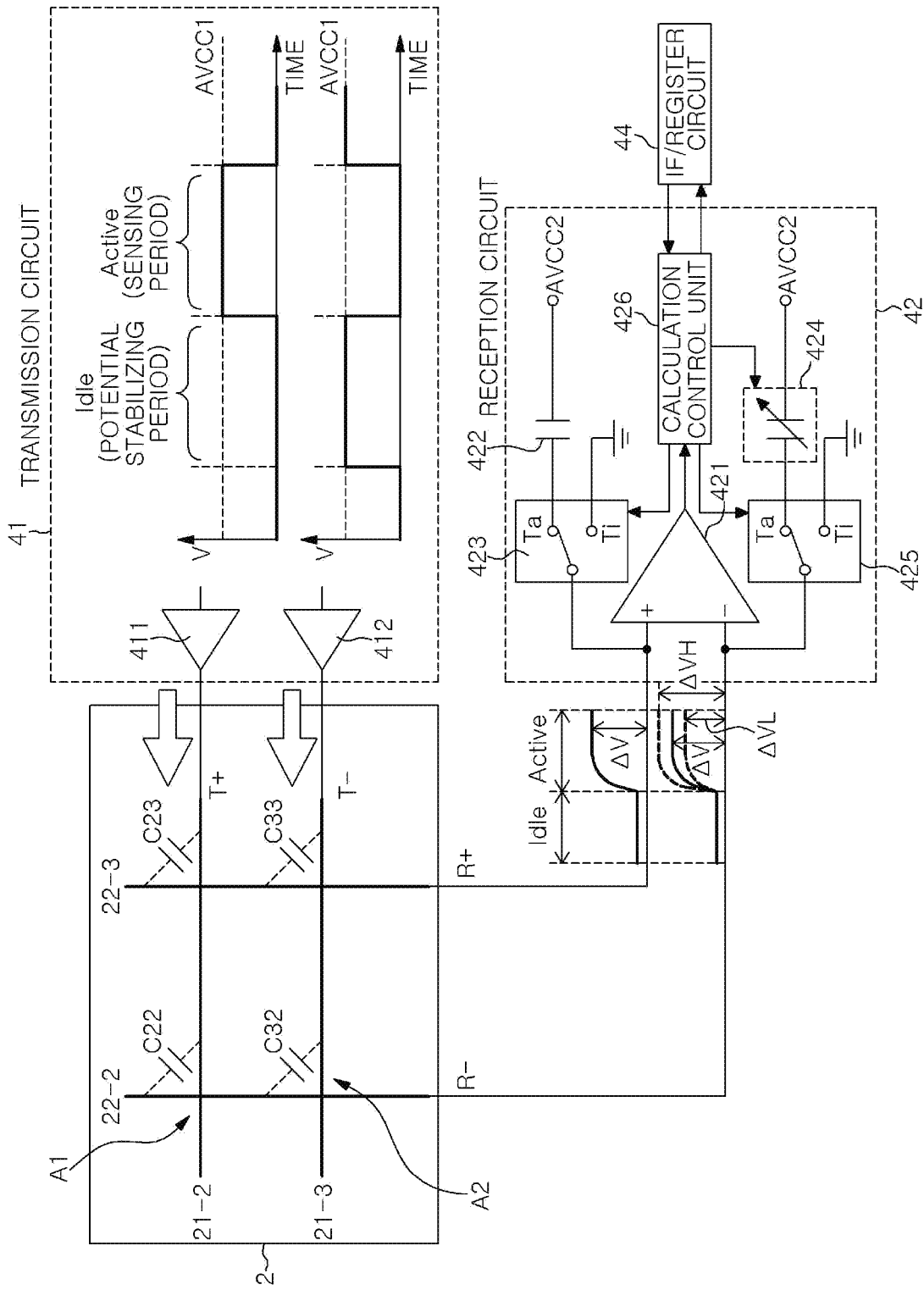

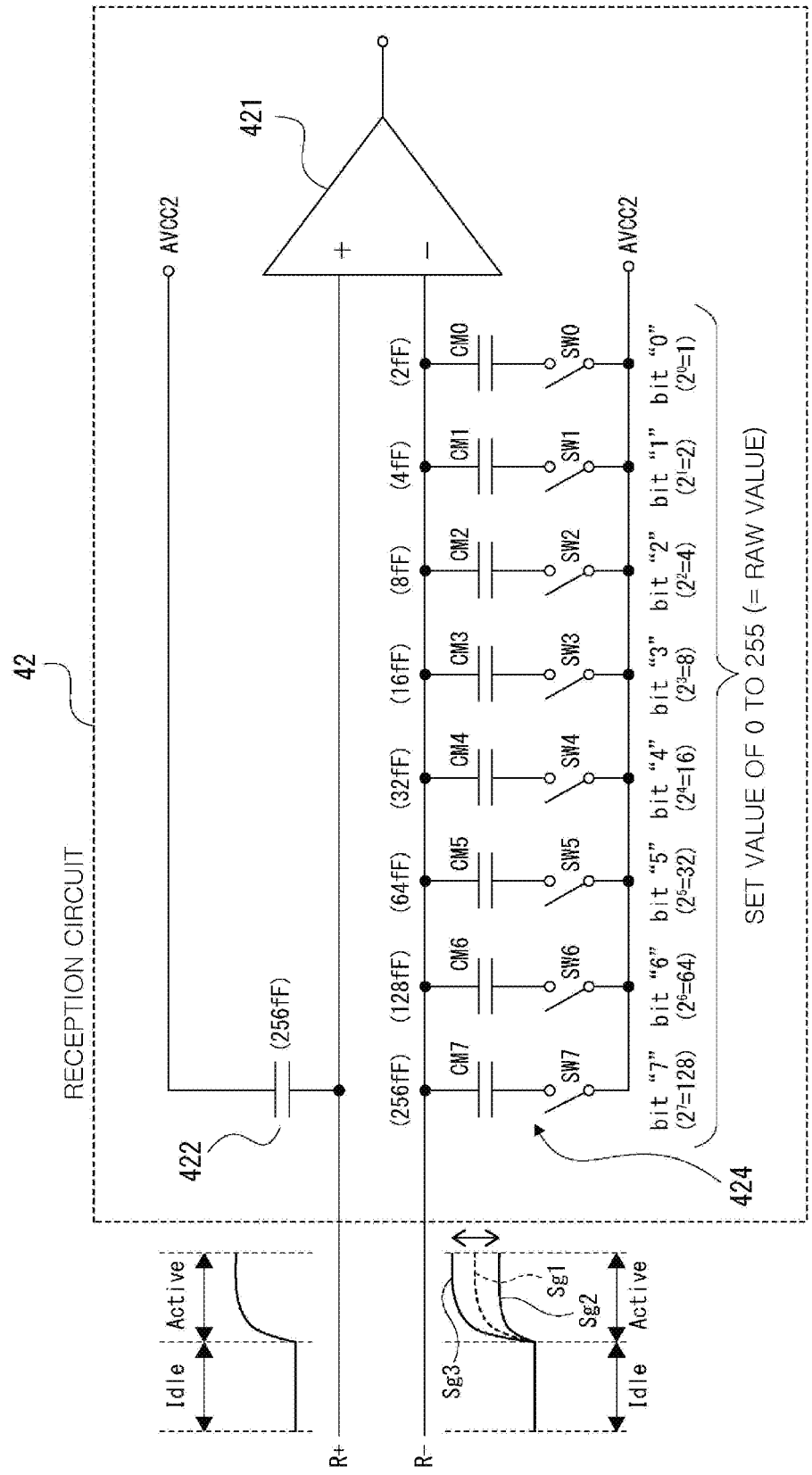

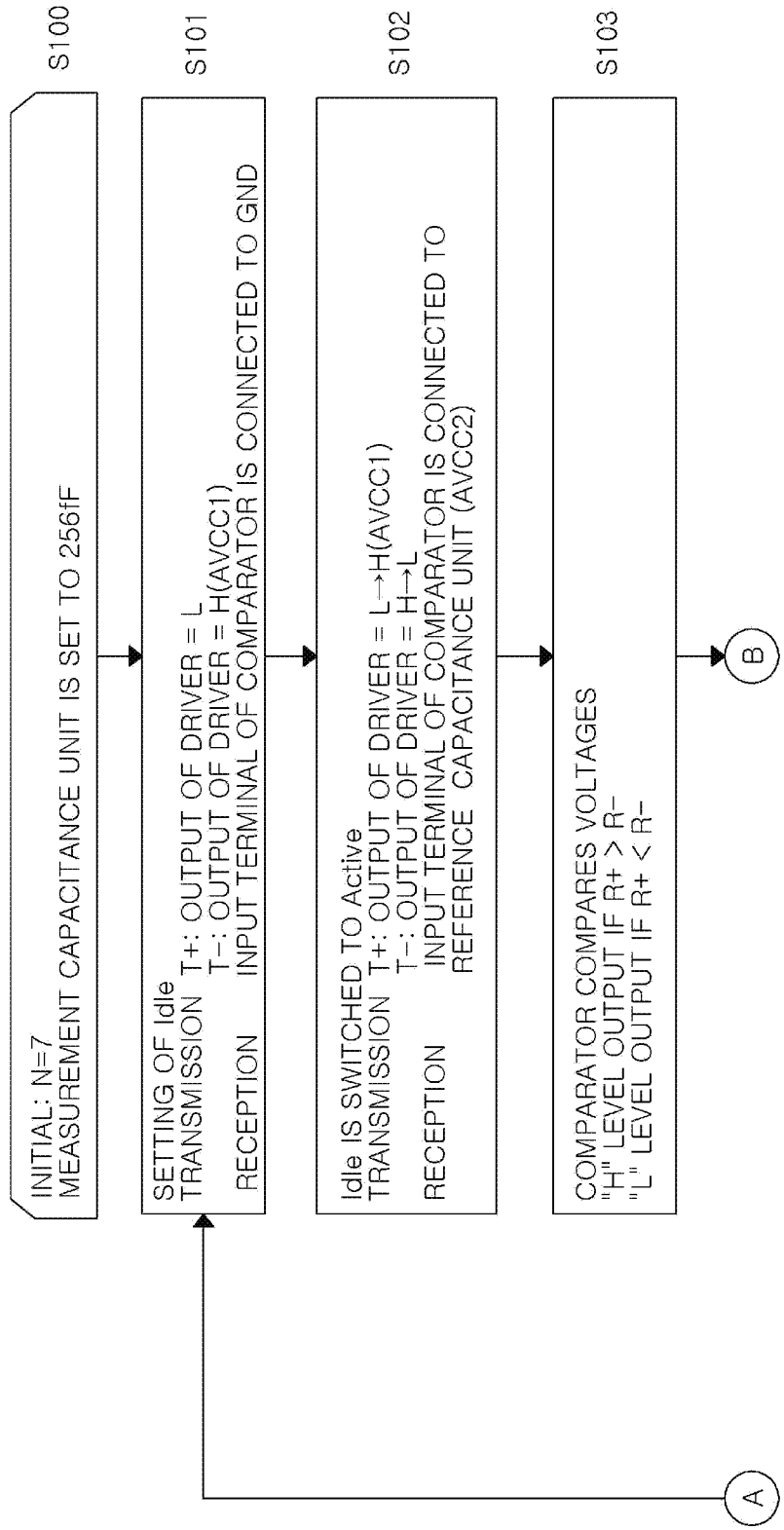

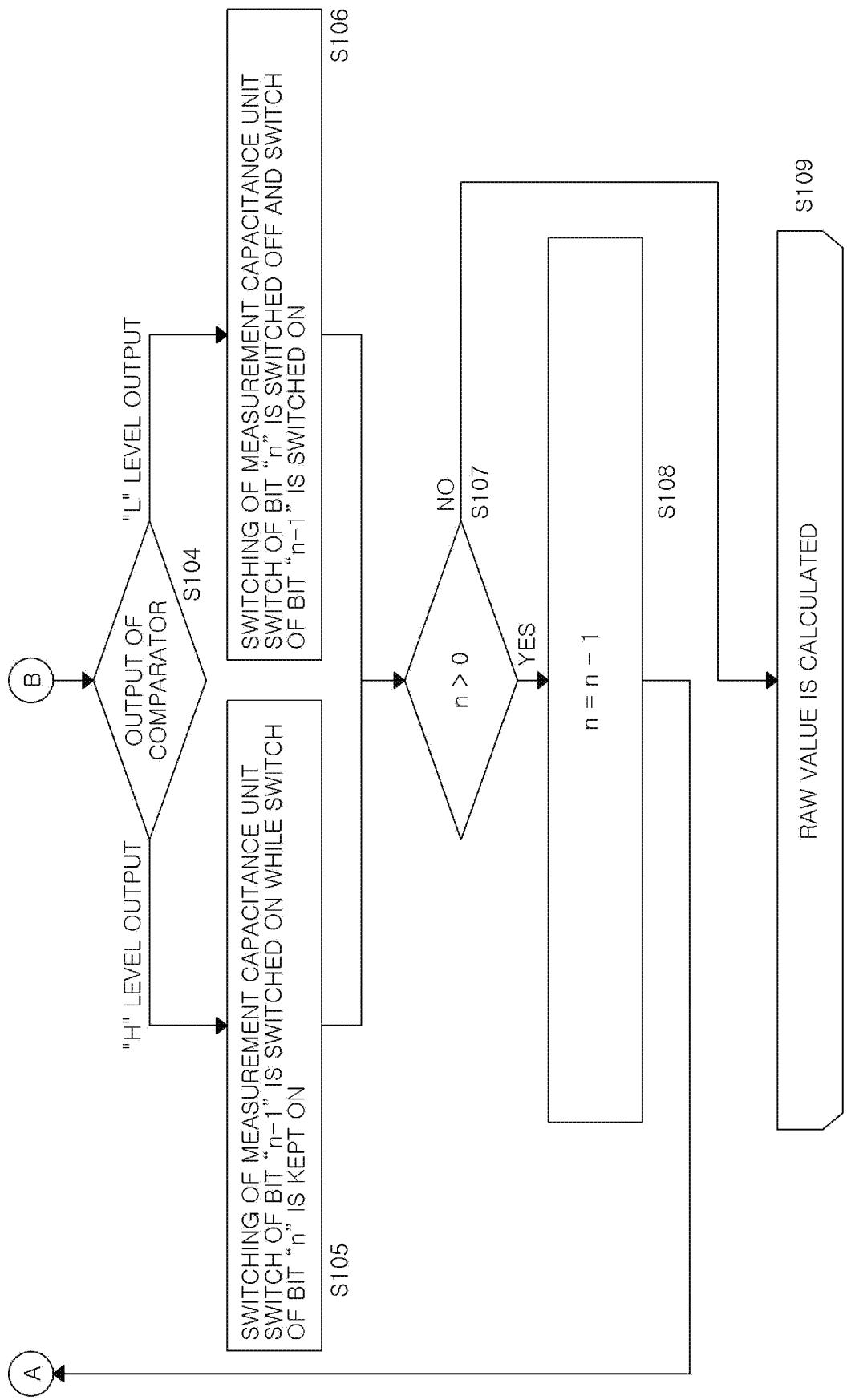

CAPACITANCE SETTING VALUE OF
MEASUREMENT CAPACITANCE UNIT

CAPACITANCE SETTING VALUE OF
MEASUREMENT CAPACITANCE UNIT

TOUCH PANEL DRIVING DEVICE AND TOUCH PANEL DEVICE

FIELD OF THE INVENTION

The present disclosure relates to a touch panel driving device and a touch panel device; and, more particularly, to a technique used for touch panel operation detection.

BACKGROUND OF THE INVENTION

Various techniques related to a touch panel are known. Japanese Patent Application Publication No. 2014-219961 discloses a sensing technique for improving resolution by detecting a touch operation position by simultaneously sensing two sets of signal lines (electrodes) (a pair of transmission signal lines and a pair of reception signal lines). Further, Japanese Patent Application Publication No. 2010-182277 discloses a so-called single layer structure in which there is no portion where electrodes intersect with each other in electrode wirings in X and Y directions.

It is important to maintain or improve sensing accuracy in the touch panel. In order to detect the operation, the signal lines of the touch panel are scanned. In the case of a capacitive type touch panel, a change or difference in a signal voltage is detected from the signal lines due to a capacitance change caused by a touch operation during the scanning. Therefore, the accuracy of the value serving as the reference for detecting the change or difference in the signal voltage affects the sensing accuracy of the touch panel operation.

In the present disclosure, it is considered to receive and detect reception signals from a pair of reception signal lines of the touch panel. Especially, a sensing operation including an operation of comparing levels of the reception signals from one reception signal line and the other reception signal line while sequentially switching a capacitance value of a measurement capacitance unit connected to the one reception signal line is performed. In this case, the accuracy of the sensing accuracy is improved by improving the accuracy of the capacitance value.

SUMMARY OF THE INVENTION

In accordance with an aspect of the present disclosure, there is provided a touch panel driving device for sequentially performing scanning for selecting a pair of adjacent transmission signal lines and a pair of adjacent reception signal lines on a touch panel, the device comprising: a reception circuit configured to receive reception signals whose waveforms are changed by a capacitance change caused by an operation from the pair of reception signal lines of the touch panel and generate a detection value for monitoring a touch panel operation. The reception circuit generates the detection value by comparing levels of the reception signals from one reception signal line and the other reception signal line while sequentially switching capacitance values of a measurement capacitance unit connected to the one reception signal line. The measurement capacitance unit includes a plurality of capacitance units each forming a certain capacitance value by parallel connection or series connection of a plurality of capacitors as a capacitance unit forming one capacitance value used for switching the capacitance value of the measurement capacitance unit. In such configurations of the present disclosure, a differential method is used as the sensing of the touch panel. That is, a detection value corresponding to the difference between the reception signals from a pair of reception signal lines is generated. To that end, levels of the reception signals from one reception signal line and the other reception signal line are compared while sequentially switching a capacitance value of a measurement capacitance unit connected to the one reception signal line. With such operations, the capacitance value (or selection control signal of the capacitance value) when the levels of the reception signals are substantially the same, becomes a value corresponding to the difference between the reception signals. Accordingly, it is possible to generate a detection value for monitoring a touch panel operation. However, if the linearity of the levels of the capacitance values of the measurement capacitance unit is poor, accurate detection is not possible. Therefore, the capacitance units each forming a certain capacitance value by parallel connection or series connection of a plurality of capacitors are provided as capacitance units each forming a certain capacitance value used for obtaining the capacitance value. In this way, the number of types of capacitance of capacitors can be reduced and the capacitance error of the capacitors is suppressed.

In the measurement capacitance unit, all the capacitance units may include capacitors having a specific capacitance value. By using the capacitance units including capacitors having a specific capacitance value, the capacitance errors of the capacitors become uniform.

A capacitance unit having a capacitance value greater than the specific capacitance value in the measurement capacitance unit may be formed by parallel connection of a plurality of capacitors having the specific capacitance value. by the parallel connection of the capacitors having the specific capacitance value, it is possible to form a capacitance unit having a capacitance value greater than the specific capacitance value.

A capacitance unit having a capacitance value smaller than the specific capacitance value in the measurement capacitance unit may be formed by series connection of a plurality of capacitors having the specific capacitance value. By series connection of the capacitors having the specific capacitance value, it is possible to form a capacitance unit having a capacitance value smaller than the specific capacitance value.

The measurement capacitance unit may include the capacitance unit forming a capacitance value smaller than a first specific capacitance value by series connection of capacitors having the first specific capacitance value, and the capacitance unit forming a capacitance value greater than a second specific capacitance value by parallel connection of capacitors having the second specific capacitance value. By using series connection of the capacitors having the first specific capacitance value when obtaining a small capacitance value or by units parallel connection of capacitors having the second specific capacitance value when obtaining a large capacitance value, the number of types of capacitance of capacitors can be reduced and the capacitance error of the capacitors is suppressed.

The measurement capacitance unit may include as the capacitance units a plurality of capacitance units from a first capacitance unit to an X-th capacitance unit which are connected in parallel to the one reception signal line, and the connections of the capacitance units from the first capacitance unit to the X-th capacitance unit to the one reception signal line may be independently switched on/off (X is a natural number of 2 or more). By connecting the first capacitance unit to the X-th capacitance unit in parallel to the one reception signal line, the measurement capacitance unit can change the composite capacitance value in multiple levels by selecting the capacitance units.

Capacitance values of the capacitance units from the first capacitance unit to the X-th capacitance unit in the measurement capacitance unit may be capacitance values having the relation of powers of 2. For example, the capacitance values of the capacitance units from the first capacitance unit to the X-th capacitance unit are capacitance values having the relation of ratio of $2^1, 2^2\ 2^3 \ldots 2^8$.

The measurement capacitance unit may include as the capacitance units a plurality of capacitance units from a first capacitance unit to an X-th capacitance unit which are connected in parallel to the one reception signal line, the connections of the capacitance units from the first capacitance unit to the X-th capacitance unit to the one reception signal may be individually switched on/off by switches corresponding thereto, and the switch corresponding to the capacitance unit formed by parallel connection of a plurality of capacitors may include a plurality of switch elements respectively connected to the plurality of capacitors (X is a natural number of 2 or more). That is, with respect to the capacitance unit formed by parallel connection of the capacitors, the switch elements are respectively connected to the capacitors and simultaneously switched on/off to serve as the switch of the corresponding capacitance unit.

In accordance with another aspect of the present disclosure, there is provided a touch panel device comprising a touch panel, and the touch panel driving device described above. That is, by employing the touch panel driving device with a high accuracy, it is possible to implement the touch panel device with an improved the sensing accuracy.

In accordance with the present disclosure, a capacitance unit forming a certain capacitance value by parallel connection or series connection of a plurality of capacitors is provided as a capacitance unit forming one capacitance value used for switching the capacitance value of the measurement capacitance unit. Therefore, the number of types of capacitance of capacitors to be arranged can be reduced. Accordingly, the influence of the capacitance errors of the capacitors is suppressed, and the linearity of the capacitance transmitted from the measurement capacitance unit to the reception signal lines at each level is improved. As a result, the sensing accuracy of the touch panel can be improved, and the reproducibility or the accuracy of the coordinates as the operation position can be improved.

BRIEF DESCRIPTION OF THE DRAWINGS

The objects and features of the present disclosure will become apparent from the following description of embodiments, given in conjunction with the accompanying drawings, in which:

FIG. 2 explains a signal line structure of a touch panel according to an embodiment;

FIG. 3 explains a sensing operation according to an embodiment;

FIG. 4 explains a measurement capacitance unit according to an embodiment;

FIGS. 5A and 5B are a flowchart showing a sequence of the sensing operation according to the embodiment;

DETAILED DESCRIPTION OF THE EMBODIMENTS

Hereinafter, an embodiment of the present disclosure will be described in the following sequence.
<1. Configuration of touch panel device>
<2. Sensing operation>
<3. Configuration for improving linearity>
(3-1: Configuration example I)
(3-2: Configuration example II)
(3-3: Configuration example III)
(3-4: Configuration example IV)
<4. Effect of embodiment and modification>

1. Configuration of Touch Panel Device

Figure 1:
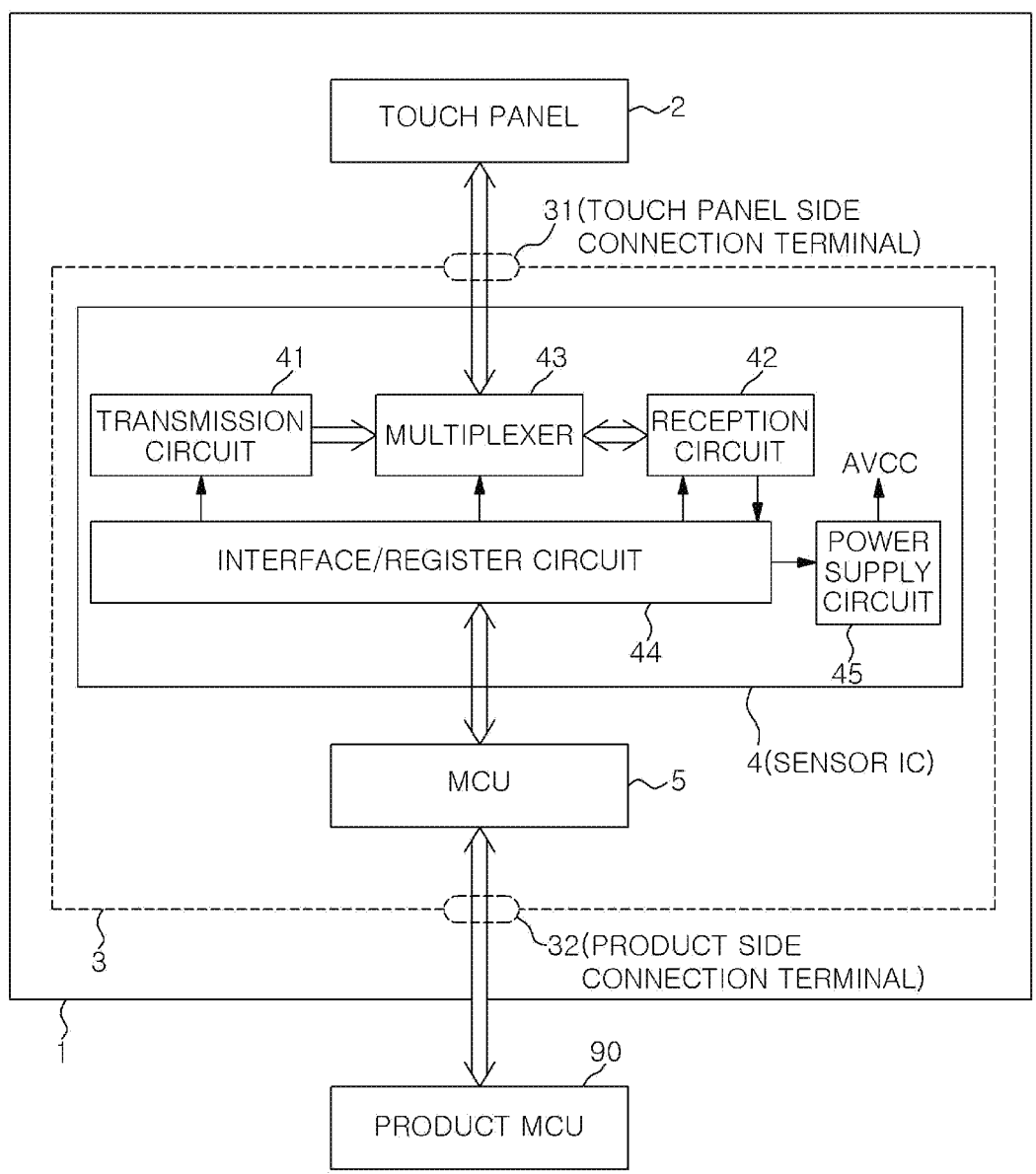
FIG. 1 is a block diagram of a touch panel device according to an embodiment.

FIG. 1 shows a configuration example of a touch panel device 1 according to an embodiment.

The touch panel device 1 is installed as a user interface device in various apparatuses. The various apparatuses include, e.g., an electronic equipment, a communication equipment, an information processing equipment, a manufacturing equipment, a machine tool, a vehicle, an aircraft, a building facility equipment, and other apparatuses in various fields. The touch panel device 1 is adopted as an operation input device for allowing a user to input an operation in various products.

FIG. 1 shows the touch panel device 1 and a product side MCU (Micro Control Unit) 90. The product side MCU 90 indicates a control unit of an apparatus having the touch panel device 1. The touch panel device 1 supplies information on user's operation on the touch panel to the product side MCU 90.

The touch panel device 1 includes a touch panel 2 and a touch panel driving device 3. The touch panel driving device 3 includes a sensor IC (Integrated Circuit) 4 and an MCU 5. The touch panel driving device 3 is connected to the touch panel 2 through a touch panel side connection terminal 31. The touch panel driving device 3 drives (senses) the touch panel 2 through the above connection. When the touch panel device 1 is installed as an operation input device at an apparatus, the touch panel drive 3 is connected to the product side MCU 90 through a product side connection terminal 32. With this connection, the touch panel driving device 3 transmits the sensed operation information to the product side MCU 90.

The sensor IC 4 in the touch panel driving device 3 includes a transmission circuit 41, a reception circuit 42, a multiplexer 43, an interface/register circuit 44, and a power supply circuit 45.

The transmission circuit 41 of the sensor IC 4 outputs a transmission signal to a terminal on the touch panel 2 selected by the multiplexer 43. The reception circuit 42 receives a signal from a terminal on the touch panel 2 selected by the multiplexer 43 and performs a required comparison process or the like. FIG. 2 schematically shows the connection state of the transmission circuit 41, the reception circuit 42, the multiplexer 43, and the touch panel 2. In the touch panel 2, N-number of transmission signal lines 21-1 to 21-n as transmission side electrodes are arranged on a panel plane forming a touch surface. Further, M-number of reception signal lines 22-1 to 22-m as reception side electrodes are arranged on the same panel plane.

The transmission signal lines 21-1 to 21-n are referred to as "transmission single lines 21" and the reception signal lines 22-1 to 22-m are referred to "reception signal lines 22", unless otherwise distinguished.

The transmission signal lines 21-1 to 21-n and the reception signal lines 22-1 to 22-m may be arranged to intersect with each other as shown in FIG. 2. Alternately, in a so-called single layer structure, they may be arranged without intersecting with each other, as disclosed in Japanese Patent Application Publication No. 2010-182277. In any case, a touch operation surface is formed within the range where the transmission signal lines 21 and the reception signal lines 22 are arranged, and an operation position is detected by capacitance changes during the touch operation.

In FIG. 2, only a part of capacitances (capacitances C22, C23, C32, and C33) occurring between the transmission signal lines 21 and the reception signal lines 22 are illustrated. However, capacitances occurring between the transmission signal lines 21 and the reception signal lines 22 (e.g., capacitances at the intersecting positions) exist on the entire touch operation surface, and the position where the capacitance changes by the touch operation is detected by the reception circuit 42.

The transmission circuit 41 outputs transmission signals to the transmission signal lines 21-1 to 21-n selected by the multiplexer 43. In the present embodiment, the multiplexer 43 performs scanning in which two adjacent transmission signal lines 21 are selected at each timing. The reception circuit 42 receives the reception signals from the reception signal lines 22-1 to 22-m selected by the multiplexer 43. In the present embodiment, the multiplexer 43 selects two adjacent reception signal lines 22 at each timing. The sensing operation performed by the transmission circuit 41 and the reception circuit 42 will be described later.

Returning back to FIG. 1, various setting information on the transmission circuit 41, the multiplexer 43, the reception circuit 42 and the power supply circuit 45 are stored in the interface/register circuit 44 of the sensor IC 4 by the MCU 5. The operations of the transmission circuit 41, the multiplexer 43, the reception circuit 42 and the power supply circuit 45 are controlled by the setting information stored in the interface/register circuit 44.

A detection value (also referred to as "RAW value") detected by the reception circuit 42 is stored in the interface/register circuit 44 so that it can be acquired by the MCU 5.

The power supply circuit 45 generates a driving voltage AVCC and supplies the generated driving voltage AVCC to the transmission circuit 41 and the reception circuit 42. As will be described later, the transmission circuit 41 applies a pulse using the driving voltage AVCC to the transmission signal line 21 selected by the multiplexer 43. The reception circuit 42 applies the driving voltage AVCC to the reception signal line 22 selected by the multiplexer 43 during the sensing operation. The configuration of the power supply circuit 45 will be described in detail later.

The MCU 5 sets and controls the sensor IC 4. Specifically, the MCU 5 stores required setting information in the interface/register circuit 44 and controls the operations of the respective components of the sensor IC 4. Further, the MCU 5 reads out and obtains the RAW value from the reception circuit 42 through the interface/register circuit 44. Then, the MCU 5 calculates the coordinates using the RAW value and transmits the coordinates as the touch operation position information of the user to the product MCU 90.

2. Sensing Operation

A sensing operation performed by the touch panel device 1 having the above configuration will be described.

First, the operations of the transmission circuit 41 and the reception circuit 42 on the touch panel 2 will be described with reference to FIG. 3. In FIG. 3, two transmission signal lines 21-2 and 21-3 and two reception signal lines 22-2 and 22-3 on the touch panel 2 are illustrated. In the present embodiment, the transmission circuit 41 and the reception circuit 42 transmit and receive two adjacent transmission signal lines 21 and two adjacent reception signal lines 22 shown in FIG. 2, thereby detecting the touch operation. In other words, the detection scanning is performed on a cell basis, the cell including a pair of the transmission signal lines 21 and a pair of reception signal lines 22. In FIG. 3, one cell is illustrated.

The transmission circuit 41 outputs a driving voltage AVCC1 from drivers 411 and 412 to two transmission signal lines 21 (21-2 and 21-3 in FIG. 3). In other words, transmission signals T+ and T−, which are the outputs of the drivers 411 and 412, are supplied to the transmission signal lines 21-2 and 21-3 selected by the multiplexer 43.

The driving voltage AVCC1 is the driving voltage AVCC generated by the power supply circuit 45 shown in FIG. 1 or a voltage based on the driving voltage AVCC. As shown in FIG. 3, in the transmission circuit 41, the driving voltage AVCC1 is set to a low level (hereinafter, referred to as "L level"), e.g., 0 V, during the idle period of the transmission signal T+ from the driver 411. During the subsequent active period, the driving voltage AVCC1 is set to a high level (hereinafter referred to as "H level"). In this case, specifically, the driving voltage AVCC1 is applied as the H level signal. Further, in the transmission circuit 41, the driving voltage AVCC1 is set to the H level during the idle period (application of the driving voltage AVCC1) of the transmission signal T− from the other driver 412, and set to the L level during the subsequent active period. During the idle period, the potentials of the reception signals R+ and R− are stabilized. During the active period, the potential changes of the reception signals R+ and R− are sensed.

During the idle period and the active period, the reception circuit 42 receives the reception signals R+ and R− from two reception signal lines 22 (22-3 and 22-2 in FIG. 3) selected by the multiplexer 43. The reception circuit 42 includes a comparator 421, a reference capacitance unit 422, switches 423 and 425, a measurement capacitance unit 424, and a calculation control unit 426. The reception signals R+ and R− from the two reception signal lines 22 are received by the comparator 421. The comparator 421 compares the potentials of the reception signals R+ and R− and outputs the comparison result to the operation control unit 426 at the H or L level.

A driving voltage AVCC2 is applied to one end of the capacitor constituting the reference capacitance unit 422. The driving voltage AVCC2 is the driving voltage AVCC generated by the power supply circuit 45 shown in FIG. 1 or a voltage based on the driving voltage AVCC. The other end of the capacitor constituting the reference capacitance unit 422 is connected to a "+" input terminal of the comparator 421 via a terminal Ta of the switch 423. The driving voltage AVCC2 is applied to one end of the measurement capacitance unit 424. The other end of the measurement capacitance unit 424 is connected to a "−" input terminal of the comparator 421 via a terminal Ta of the switch 425.

In the switches 423 and 425, a terminal Ti is selected during the idle period. Therefore, during the idle period, the + input terminal (the reception signal line 22-3) and the − input terminal (the reception signal line 22-2) of the comparator 421 are grounded, and the reception signals R+ and R− have the ground potential. In the switches 423 and 425, the terminal Ta is selected during the active period. Therefore, during the active period, the driving voltage AVCC2 is applied to the "+" input terminal (the reception signal line 22-3) and the "−" input terminal (the reception signal line 22-2) of the comparator 421.

In FIG. 3, the waveforms of the reception signals R+ and R− in a non-touch state of the cell are indicated by solid lines. In the idle period, the terminal Ti is selected in the switches 423 and 425 and, thus, the reception signals R+ and R− are stabilized at a certain potential (ground potential). In the active period, the terminal Ta is selected in the switches 423 and 425 and, thus, the driving voltage AVCC2 is applied to the reception signal lines 22-3 and 22-2. Accordingly, the potentials of the reception signals R+ and R− are increased by ΔV. In the non-touch state, the potentials of both reception signals R+ and R− are increased by ΔV. On the other hand, in the transmission circuit 41, the transmission signal T+ rises and the transmission signal T− falls in the active period, as described above. Therefore, when the touch operation is performed, the degree of potential increase of the reception signals R+ and R− changes. If an A1 position that affects the capacitance C22 is touched, the potential of the reception signal R− is increased by ΔVH as indicated by a broken line during the active period. If an A2 position at which the capacitance C32 changes is touched, the potential of the reception signal R− is increased by ΔVL as indicated by a broken line during the active period. In this manner, the potential change amount of the reception signal R− becomes greater or smaller than the potential change amount ΔV of the reception signal R+ depending on the touch operation position for the cell. The comparator 421 compares the reception signals R+ and R−.

The potential difference between the reception signals R+ and R− which changes as described above may be outputted as the RAW value (detection result). However, in the present embodiment, in order to obtain the RAW value, the calculation control unit 426 in the reception circuit 42 changes the setting of the measurement capacitance unit 424 such that the voltage balance of the signals R+ and R− can be obtained. The operation control unit 426 controls on/off of the switches 423 and 425 or switches the capacitance value of the measurement capacitance unit 424 based on the setting information stored in the interface/register circuit 44. Further, the operation control unit 426 monitors the output of the comparator 421 and calculates the RAW value in a subsequence process. The RAW value calculated by the operation control unit 426 is stored in the interface/register circuit 44 so that it can be acquired by the MCU 5.

As shown in FIG. 4, the measurement capacitance unit 424 indicated as the variable capacitance capacitor in FIG. 3 includes, e.g., a plurality of capacitance units CM (CM0 to CM7) and switches SW (SW0 to SW7). FIG. 4 shows an equivalent circuit in a state where the switches 423 and 425 are connected to the terminal Ta (active period). The illustration of the switches 423 and 425 is omitted in FIG. 4. The capacitance units CM0 to CM7 are connected in parallel between the potential of the driving voltage AVCC2 and the "−" input terminal of the comparator 421. The switches SW0 to SW7 are connected in series to the capacitance units CM0 to CM7, respectively. In other words, the capacitance unit CM that affects the reception signal R− can be changed by switching on/off the switches SW0 to SW7. In FIG. 4, each of the capacitance units CM0 to CM7 is indicated as one capacitor. However, in the present embodiment, each of the capacitor units CM0 to CM7 includes one or more capacitors, as will be described later with reference to FIG. 7. Each of the switches SW0 to SW7 includes a switch element, e.g., a FET (Field Effect Transistor) or the like. However, one switch SW may include a plurality of switch elements, as will be described later with reference to FIG. 11.

The capacitance values of the capacitance units CM0 to CM7 are selected in the following manner: CM0=2 fF (femto farad), CM1=4 fF, CM2=8 fF, CM3=16 fF, CM4=32 fF, CM5=64 fF, CM6=128 fF, CM7=256 fF. The capacitance values of the capacitance units CM0 to CM7 are selected as a value of 8 bits from bit "0" to bit "7". The capacitor CM0 and the switch SW0 function as bit "0"; the capacitor CM1 and the switch SW1 function as bit "1"; . . . the capacitor CM7 and the switch SW7 function as bit "7". A capacitance set value of 0 (="00000000") to 255 (="11111111") is given as a 8-bit value. The capacitance set value is one of the setting information stored in the interface register circuit 44 by the MCU 5. In the reception circuit 42, the switches SW0 to SW7 are switched on/off depending on the capacitance set value of 8 bits. In other words, the switches SW0 to SW7 are switched off when the corresponding bit is "0" and switched on when the corresponding bit is "1". Accordingly, the total capacitance value of the measurement capacitance unit 424 is varied in 256 steps within the range of 0 fF to 510 fF.

On the other hand, the capacitance value of the capacitor of the reference capacitance unit 422 on the reception signal R+ side is, e.g., 256 fF.

As described above, in the reception signal R−, the degree of potential increase of the waveform in the active period changes depending on whether or not the touch has been made and the touch position, if any. The degree of potential increase becomes greater or smaller than the degree of waveform rise ΔV of the reception signal R+.

In the configuration shown in FIG. 4, by changing the capacitance set value of the measurement capacitance unit 424, the degree of potential increase of the waveform of the reception signal R− can be changed. For example, it is possible to search the capacitance set value of the measurement capacitance unit 424 which is equivalent to the reception signal R+.

For example, on the assumption that a waveform Sg1 of the reception signal R− which is indicated by a broken line in FIG. 4 is in an initial state, if the capacitance of the measurement capacitance unit 424 is decreased, the waveform of the reception signal R− becomes the waveform Sg2 lower than the waveform Sg1. If the capacitance of the measurement capacitance unit 424 is increased, the waveform of the reception signal R− becomes the waveform Sg3 higher than the waveform Sg1.

In other words, the capacitance set value of the measurement capacitance unit 424, which is obtained when the voltage levels of the reception signals R+ and R− become the same in the comparator 421, becomes equivalent to a value corresponding to the voltage change of the reception signal R− by the touch. Therefore, the capacitance set value of the measurement capacitance unit 424 is changed while monitoring the output of the comparator 421, and the capacitance set value at which the voltages of the reception signals R+ and R− become the same in the active period is searched. Then, the searched capacitance set value can be used as the RAW value as the touch operation sensing information.

A specific sequence of the above sensing operation will be described with reference to FIGS. 5A and 5B. FIGS. 5A and 5B show processes performed by the transmission circuit 41 and the reception circuit 42 based on various setting information stored in the interface/register circuit 44 by the MCU 5. In FIGS. 5A and 5B, the loop processing from steps S100 to S109 shows a sensing procedure for one cell (a set of two transmission signal lines 21 and two reception signal lines 22). The capacitance set value is changed to eight different values (changed seven times from the initial state) until the RAW value is obtained.

In the step S100, first, a variable n is set to 7 as an initial value. The reception circuit 42 sets a capacitance value of the measurement capacitance unit 424 to 256 fF based on the instruction of the MCU 5 (capacitance set value). In other words, when the capacitance set value becomes 128 (=10000000) and only the bit "7" is "1", only the switch SW7 is switched on.

In the step S101, the idle period is set.

In the transmission circuit 41, the transmission signal T+ from the driver 411 is set to the L level and the transmission signal T− is set to the H level (=driving voltage AVCC1). In the reception circuit 42, the switches 423 and 425 are connected to the terminal T1. Accordingly, the "+" input terminal and the "−" input terminal of the comparator 421 are grounded.

Next, in the step S102, the idle period is switched to the active period as a predetermined period of time elapses. In the transmission circuit 41, the transmission signal T+ from the driver 411 is set to the H level (=driving voltage AVCC) and the transmission signal T− from the driver 412 is set to the L level. In the reception circuit 42, the switches 423 and 425 are connected to the terminal Ta. Accordingly, the "+" input terminal of the comparator 421 is connected to the driving voltage AVCC2 via the reference capacitance unit 422, and the "−" input terminal of the comparator 421 is connected to the driving voltage AVCC2 via the measurement capacitance unit 424.

In the active period, the reception signals R+ and R− rise by ΔV. Since, however, the transmission signal T+ rises and the transmission signal T− falls, the increase amount of the reception signal R− is changed (to ΔVH or ΔVL) depending on whether or not the cell that is being detected has been touched or the touch operation position, if any. In the step S103, the comparator 421 compares the reception signals R+ and R− and outputs the comparison result. When the condition "(reception signal R+)>(reception signal R−)" is satisfied, the H level output is obtained from the comparator 421. When the condition "(reception signal R+)<(reception signal R−)" is satisfied, the L level output is obtained from the comparator 421.

In the step S104, the processing branches off based on the output of the comparator 421.

If the H level is outputted from the comparator 421, the capacitance of the measurement capacitance unit 424 is switched in the step S105. In this case, the switch of bit "n−1" is switched on in a state where the switch of bit "n" is in an on state. When the capacitance set value is "10000000" in the initial state and only the switch of bit "7" is switched on as described above, the capacitance set value becomes "11000000" and the switch of bit "7" and the switch of bit "6" are switched on. In other words, the switches SW7 and SW6 are switched on, and the capacitance value of the measurement capacitance unit 424 becomes 384 fF. If the condition "n>0" is satisfied in the step S107, the variable n is decreased in the step S108 and the processing returns to the step S101. In other words, after the capacitance of the measurement capacitance unit 424 is increased, the operations in the idle period and the active period are performed to monitor the output of the comparator 421.

If the L level is outputted from the comparator 421 in the step S104, the capacitance of the measurement capacitance unit 424 is switched in the step S106. In this case, the switch of bit "n" is switched off and the switch of bit "n−1" is switched on. When the capacitance set value is "10000000" in the initial state and only the switch of bit "7" is switched on, the capacitance set value becomes "01000000" and the switch of bit "7" is switched off and the switch of bit "6" is switched on. In other words, the switch SW7 is switched off and the switch SW6 is switched on, and the capacitance value of the measurement capacitance unit 424 becomes 128 fF. If the condition "n>0" is satisfied in the step S107, the variable n is decreased in the step S108 and the processing returns to the step S101. In other words, after the capacitance of the measurement capacitance unit 424 is decreased, the operations in the idle period and the active period are performed to monitor the output of the comparator 421.

By performing the above processes until the condition "n=0" is satisfied, the capacitance set value obtained when the voltage value of the reception signal R− in the active period and that of the reception signal R+ in the active period are balanced is determined. When the condition "n=0" is satisfied, the bit "n−1" does not exist in the steps S105 and S106, and, thus, the processing of the bit "n−1" is not performed. If the condition "n=0" is satisfied in the step S107, the processing proceeds to the step S109, and the reception circuit 42 calculates the RAW value. This is a process of obtaining the sum of powers of 2 of the bits of the switches SW switched on in the measurement capacitance unit 424. For example, if the switches SW5, SW3, and SW2 are finally switched on, the RAW value becomes 44 based on the calculation $2^5 + 2^3 + 2^2 = 44$.

The MCU 5 acquires the RAW value thus obtained as the detection value of one cell through the interface/register circuit 44. Similarly, the processing shown in FIGS. 5A and 5B is performed on each cell (a set of two transmission signal lines 21 and two reception signal lines 22) on the touch panel 2 to obtain the RAW value. The MCU 5 acquires the RAW value for each cell, calculates the coordinates of the touch operation position, and transmits the coordinates to the product side MCU 90.

In the present embodiment, the difference between the reception signals R+ and R− is obtained by the above sensing operation. Thus, the obtained RAW value is not affected by the external environment, which makes it possible to improve the detection accuracy of the touch operation. Especially in the non-touch state, the potentials of the reception signals R+ and R− are balanced, and the difference in the potentials of the reception signals R+ and R− is generated by the capacitance change caused by the touch. The capacitance value of the measurement capacitance unit 424 is sequentially changed to search for a capacitance value at which the reception signals R+ and R− are balanced, and the RAW value is obtained from the capacitance set value that specifies the capacitance value. Accordingly, it possible to accurately detect the difference between the reception signals R+ and R− which is generated by the capacitance change caused by the touch operation.

There are two main reasons why the selected reception signal line 22 is charged by applying the driving voltage AVCC2 from the reception circuit 42. First, when the touch panel 2 has a single layer structure, in a non-touch state, there is substantially no capacitance between the transmission signal line 21 and the reception signal line 22. In other words, the space between the transmission signal line 21 and the reception signal line 22 (between the electrodes) is insulated. However, even in the non-touch state, the reception signal waveform needs to rise during the active period. Therefore, the driving voltage AVCC2 is transmitted to perform a satisfactory sensing operation even in the case of the single layer structure. The other reason is not limited to the single layer. In the above sensing operation, the degree of potential increase of the reception signal R− from the transition to the active period is observed. However, the influence of the fall of the transmission signal T− needs to be monitored. In other words, the potential increase ΔVL indicated by a broken line in FIG. 3 needs to be observed. If the potentials of the reception signals R+ and R− in the non-touch state during the active period are 0 V, when the influence of the fall of the signal exists, the potential of the reception signal R− becomes a minus value, which is difficult to be dealt with in the reception circuit 42. Therefore, the potential of the reception signal R− is maintained at a level higher than 0 V, and the driving voltage AVCC2 is applied to easily and appropriately observe the potential change of the reception waveform due to the influence of the fall of the transmission signal T−.

3. Configuration for Improving Linearity 3-1: Configuration Example I

In the sensing operation in which the capacitance change by the touch is detected by comparing the reception signals R+ and R− while changing the capacitance value of the measurement capacitance unit 424, the detection accuracy is greatly affected by the linearity of the capacitance value of the measurement capacitance unit 424.

For example, when the switches SW0 to SW5 are switched on at the capacitance set value of 63 (=00111111), the capacitance value of the measurement capacitance unit 424 becomes 126 fF. When only the switch SW6 is switched on at the capacitance set value of 64 (=01000000), the capacitance value of the measurement capacitance unit 424 becomes 128 fF.

Figure 6:
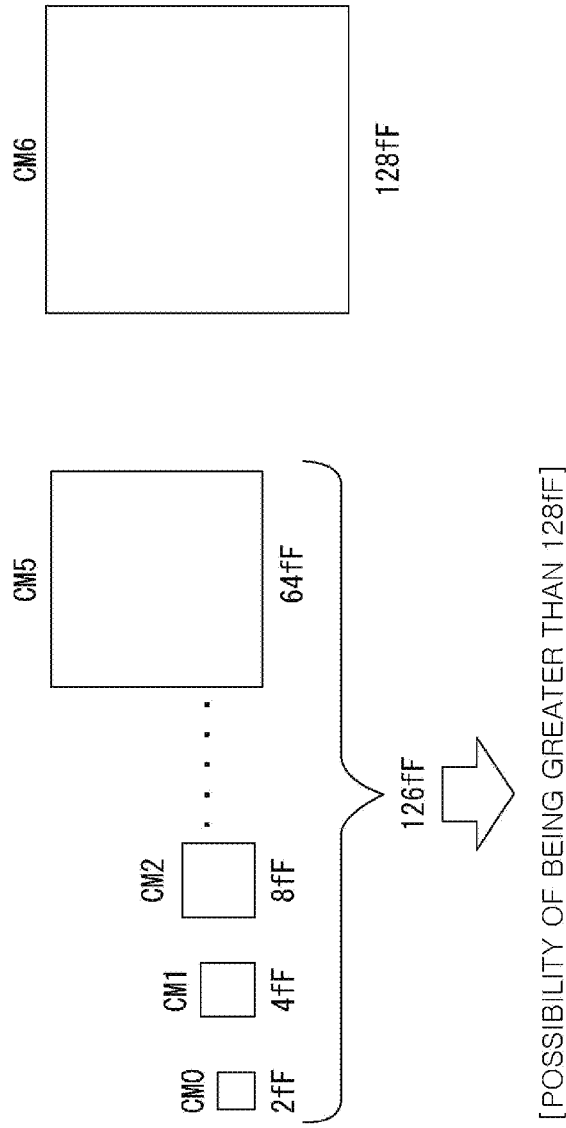
FIG. 6 explains layout images of different capacitances.

Here, it is assumed that each of the capacitance units CM0 to CM7 is one capacitor. For example, it is assumed that the capacitance unit CM0 is a 2 fF capacitor; the capacitance unit CM1 is a 4 fF capacitor; the capacitance unit CM2 is a 8 fF capacitor; . . . and the capacitance unit CM7 is a 256 fF capacitor. FIG. 6 shows the area of the capacitor of each capacitance unit CM. When the capacitance set value is 63, the capacitance value of the measurement capacitance unit 424 becomes 126 fF due to the parallel connection of the six capacitors of the capacitance units CM0 to CM5. When the capacitance set value is 64, the capacitance value of the capacitance unit 424 becomes 128 fF due to the capacitance unit CM6. However, it is difficult to make a capacitor of an extremely small capacitance such as 2 fF have an accurate capacitance. Further, as the area of the capacitor is decreased, the influence of the manufacturing error is increased. Thus, the capacitance obtained by the parallel connection of the six capacitors CM0 to CM5 may not become 126 fF and may become greater than 128 fF due to the manufacturing errors. Then, the capacitance obtained when the capacitance setting value is 64 becomes smaller than that obtained when the capacitance set value is 63. As described above, the magnitude relation of the capacitance values of 256 levels to be controlled by the capacitance set value may be reversed. A state where such phenomenon often occurs is referred to as a "state of poor linearity". As can be seen from the processing of FIGS. 5A and 5B, if the linearity is poor, the RAW value cannot be accurately generated.

Therefore, in the present embodiment, the linearity is improved by providing a plurality of capacitors having a specific capacitance value for the capacitance units CM0 to CM7 in the measurement capacitance unit 424.

Figure 7:
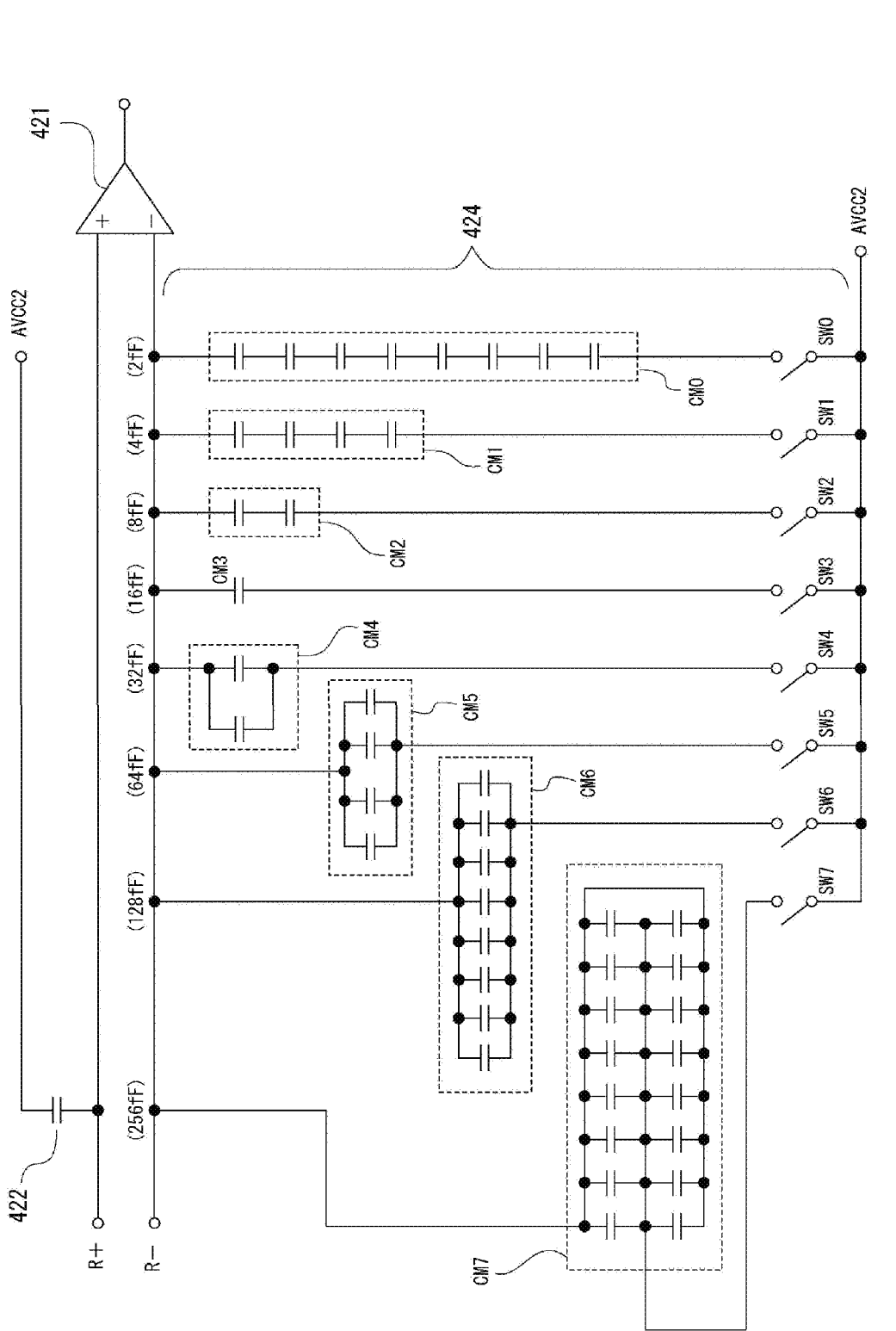
FIG. 7 explains a configuration example I of a capacitor of the measurement capacitance unit according to the embodiment.

A specific example is shown in FIG. 7. As described with reference to FIG. 4, the capacitance units CM0 to CM7 of the measurement capacitance unit 424 have capacitances of 2 fF, 4 fF, 8 fF, 16 fF, 32 fF, 64 fF, 128 fF and 256 fF, respectively. All the capacitance units CM0 to CM7 are formed as 16 fF capacitors.

The capacitance unit CM3 includes one 16 fF capacitor. The capacitance unit CM4 has a capacitance of 32 fF by parallel connection of two capacitors of 16 fF. The capacitance unit CM5 has a capacitance of 64 fF by parallel connection of four capacitors of 16 fF.

The capacitance unit CM6 has a capacitance of 128 fF by parallel connection of eight capacitors of 16 fF. The capacitance unit CM7 has a capacitance of 256 fF by parallel connection of 16 capacitors of 16 fF. The capacitance unit CM2 has a capacitance of 8 fF by series connection of two capacitors of 16 fF. The capacitance unit CM1 has a capacitance of 4 fF by series connection of four capacitors of 16 fF. The capacitance unit CM0 has a capacitance of 2 fF by series connection of eight capacitors of 16 fF.

Figure 8A:
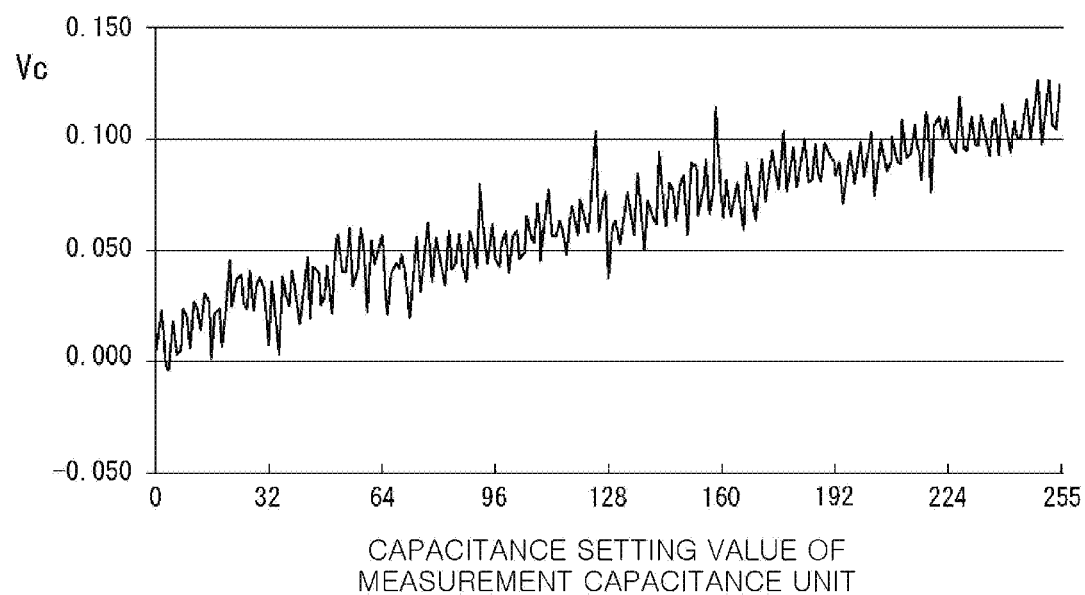
FIGS. 8A and 8B explain improvement of coordinate detection accuracy in the embodiment.
Figure 8B:
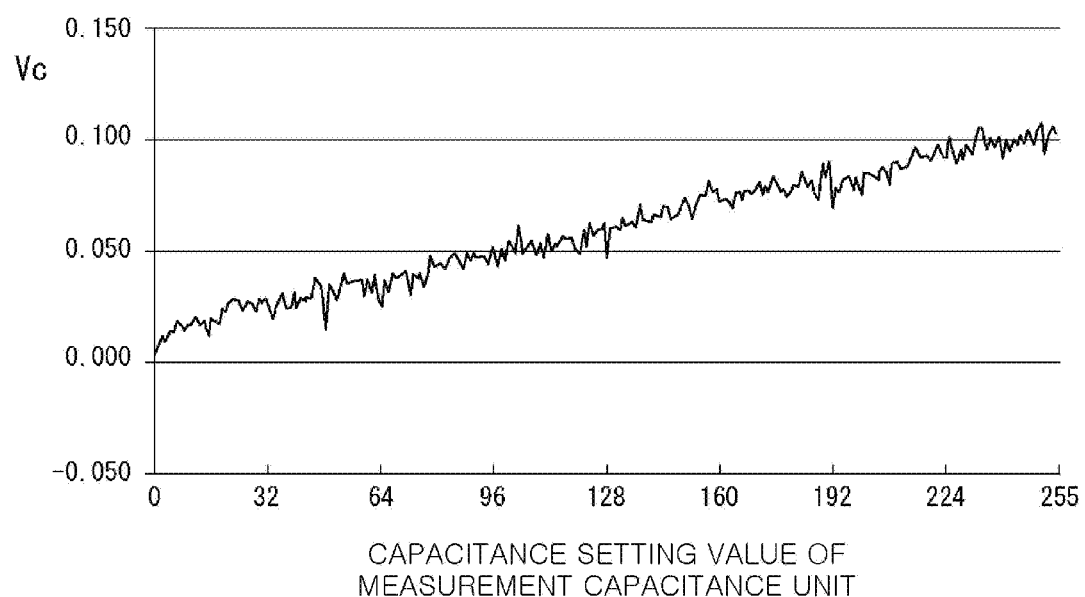

FIGS. 8A and 8B show the linearity improvement effect obtained by the above-described configuration. FIG. 8A shows a case where the capacitance units CM0 to CM7 are capacitors having different capacitance values. FIG. 8B shows a case where the capacitance units CM0 to CM7 are capacitors having the same capacitance value as shown in FIG. 7. The horizontal axis represents the capacitance setting value of 0 to 255. The vertical axis represents the output voltage Vc. The output voltage Vc is a voltage value of a rising waveform which is obtained when the driving voltage AVCC2 (voltage value outputted to the comparator 421) is applied in a state where the measurement capacitance unit 424 is not connected to the reception signal line 22. The observed output voltage Vc indirectly indicates the capacitance value of the measurement capacitance unit 424 at each level.

FIG. 8A shows that the linearity of the capacitance value of the measurement capacitance unit 424 is poor. In other words, the observed output voltage Vc (capacitance value) fluctuates up and down and the linearity is considerably poor. On the other hand, FIG. 8B shows that the up and down fluctuation of the observed output voltage Vc (capacitance value) is considerably suppressed and the linearity is considerably improved.

The reason why the linearity is improved when the capacitance units CM0 to CM7 are capacitors having the same capacitance value as shown in FIG. 7 is considered as follows.

The capacitance of the capacitor depends on an area or a peripheral length. An error of the finished dimension of the layout of the capacitor in the IC is indicated as a capacitance error. At this time, as the layout area is increased, the influence of the dimensional error is decreased. As the layout area is decreased, the influence of the dimensional error is increased. Basically (theoretically), the capacitance of the capacitor is proportional to the area.

Figure 9A:
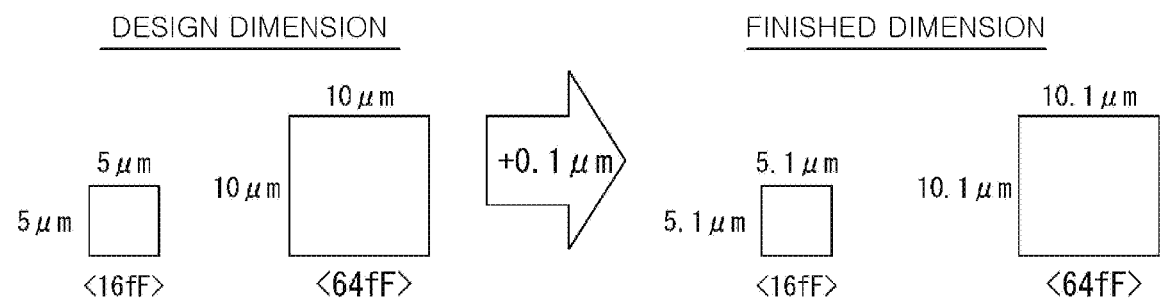
FIGS. 9A and 9B explain influence of a manufacturing error on a capacitor's capacitance.

FIG. 9A shows examples of design dimensions and finished dimensions of a 16 fF capacitor and a 64 fF capacitor. The 16 fF capacitor has a square shape with a design dimension of 5μ×5 μm, and the 64 fF capacitor has a square shape with a design dimension of 10μ×10 μm. Here, it is assumed that the finished dimension on the IC is +0.1 μm. The 16 fF capacitor has a square shape with a finished dimension of 5.1μ×5.1 μm, and the 64 fF capacitor has a square shape with a finished dimension of 10.1μ×10.1 μm.

The variation in the capacitance of the 16 fF capacitor is calculated as (5.1μ×5.1 μm)÷(5μ×5 μm)=1.04, and the capacitance error is 4%. The variation in the capacitance of the 64 fF capacitor is calculated as (10.1μ×10.1 μm)÷(10μ× 10 μm)=1.01, and the capacitance error is 2%.

If the finished dimension is +0.1 μm, the actual capacitance is calculated as follows.

16 fF: 4% error=16.64 fF
32 fF: 2.8% error=32.9 fF
64 fF: 2% error=65.28 fF
128 fF: 1.4% error=129.79 fF
256 fF: 1% error=258.56 fF Here, when the capacitance value of the measurement capacitance unit 424 is 254 fF, the sum of the capacitance values of the capacitance units CM0 to CM6 is calculated. The sum of the capacitance values of the capacitance units CM0 to CM6 is 259.17 fF (2.08+4.16+8.32+16.64+32.9+ 65.28+129.79=259.17[fF]) even if the error from 2 fF to 8 fF is 4% that is the same as that in the case of 16 fF. In other words, the capacitance value obtained when the target capacitance value is "254 fF" becomes "259.17 fF". On the other hand, since the actual "256 fF" capacitor is 258.56 fF due to the error, reverse phenomenon 254 fF≥256 fF occurs. In other words, the capacitance error caused by the error of the finished dimension varies, so that such reversal phenomena often occur at 256 levels of the variable capacitance, which results in poor linearity.

Figure 9B:
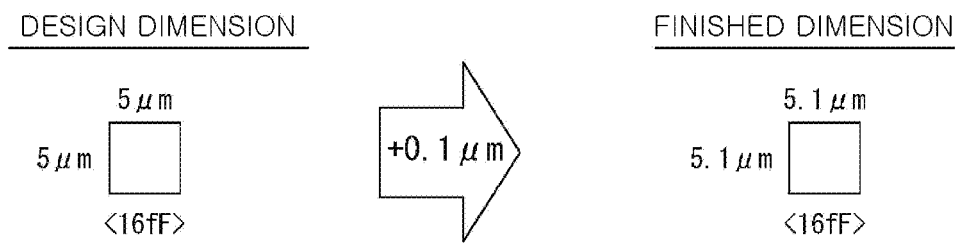

On the other hand, in the present embodiment, since only the 16 fF capacitor is used, the error of the finished dimension that affects the capacitance error of each capacitor is substantially uniform. In that case, the capacitance errors in the capacitance units CM become substantially the same regardless of the magnitude of the capacitance. In other words, on the assumption that the finished dimension is +0.1 μm as shown in FIG. 9B, the actual capacitance is calculated as follows. At this time, it is assumed that all the capacitors have a square shape of 5.1μ×5.1 μm.

16 fF capacitance unit CM3: 4% error=16.64 fF
32 fF capacitance unit CM4: 16.64 fF×2=33.28 fF
64 fF capacitance unit CM5: 16.64 fF×4=66.56 fF
128 fF capacitance unit CM6: 16.64 fF×8=133.12 fF
256 fF capacitance unit CM7: 16.64 fF×16=266.24 fF In this case, since the capacitance error is 4%, the reversal phenomenon "254 fF≥256 fF" does not occur. Accordingly, the linearity is greatly improved.

3-2: Configuration Example II

Another configuration (configuration example II) of the measurement capacitance unit 424 for improving the linearity will be described. As shown in FIG. 7, the linearity can be improved by using the capacitors having the same capacitance value as the capacitance units CM0 to CM7. However, an example in which the capacitance accuracy can be further improved is shown in FIG. 10.

Figure 10:
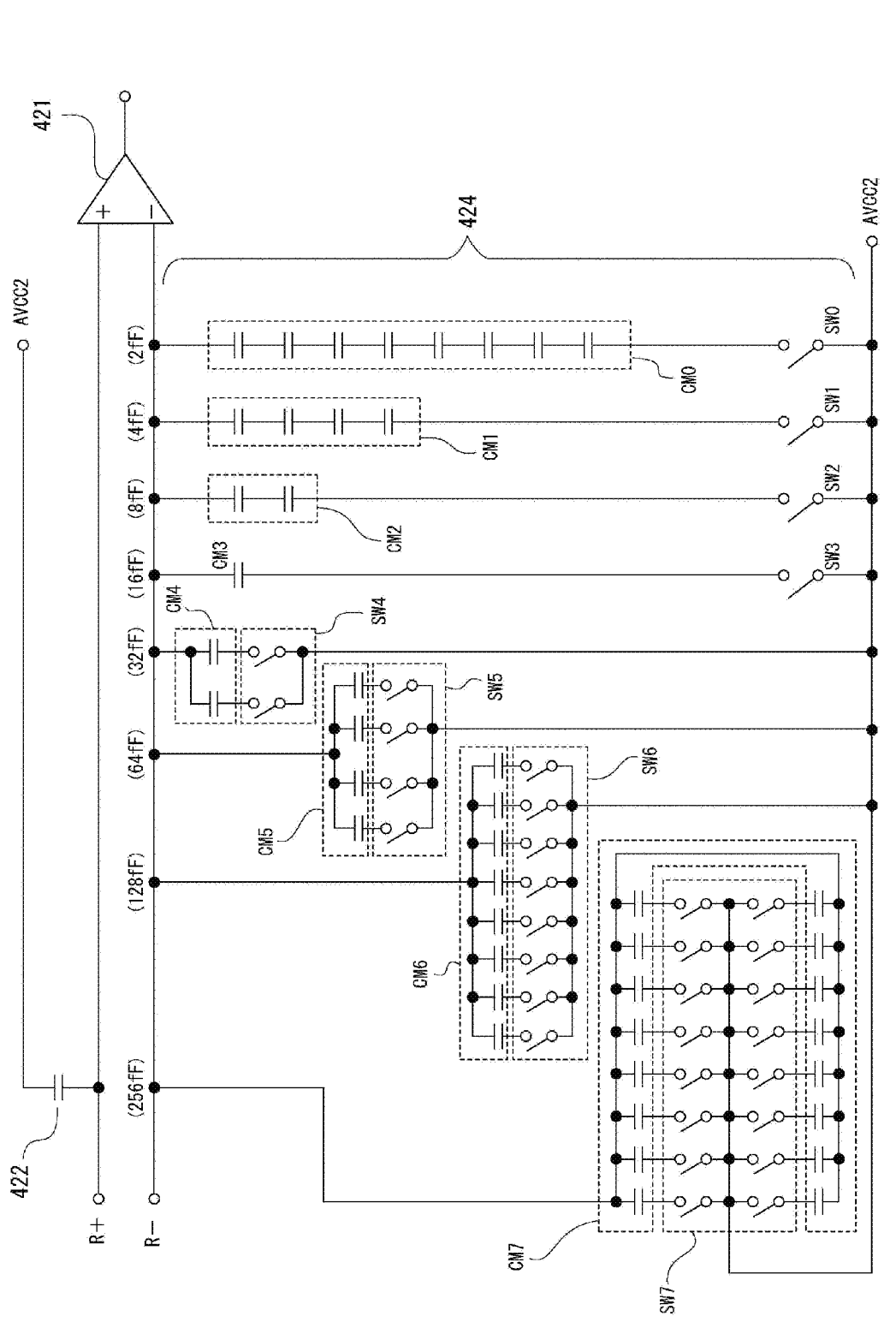
FIG. 10 explains a configuration example II of the capacitor of the measurement capacitance unit according to the embodiment.

In the measurement capacitance unit 424 of FIG. 10, all the capacitance units CM0 to CM7 are 16 fF capacitors as shown in FIG. 7. In FIG. 10, in the switches SW4 to SW7 corresponding to the capacitance units CM4 to CM7 formed by parallel connection of a plurality of capacitors, switching elements are provided to correspond to the capacitors by 1:1.

For example, in the capacitance unit CM4, 32 fF is obtained by parallel connection of two 16 fF capacitors. As for the switch SW4 corresponding thereto, two switch elements corresponding to the two capacitors are provided. This is also applied to the switches SW5, SW6 and SW7. For example, in the capacitor part CM7, 256 fF is obtained by parallel connection of 16 fF capacitors. As for the switch SW7 corresponding thereto, 16 switch elements corresponding to the 16 capacitors are provided. In the capacitance unit CM in the measurement capacitance unit 424, the switch elements are provided to correspond to the 16 fF capacitors connected in parallel.

The on/off of the plurality of switch elements constituting the switch SW corresponding to one capacitance unit CM are simultaneously controlled. For example, two switch elements of the switch SW4 are simultaneously switched on in the case of selecting the capacitance unit CM4 and simultaneously switched off in the case of removing the capacitance unit CM4 from the entire capacitance.

The improvement of the linearity can be promoted by arranging the switch elements in parallel. A parasitic capacitance is generated between the wirings of the capacitors of the capacitance unit CM and the switch elements of the switch SW. The parasitic capacitance can become uniform by connecting the switch elements to the capacitors connected in parallel in the capacitance units CM4 to CM7. Accordingly, the capacitance error caused by the parasitic capacitance can be reduced, and a highly accurate capacitance value can be obtained. As a result, the linearity can be improved.

3-3: Configuration Example III

A configuration example III of the measurement capacitance unit 424 will be described with reference to FIG. 11.

In this example, a capacitor having a first specific capacitance value and a capacitor having a second specific capacitance value are used as the capacitance units CM0 to CM7.

The capacitor having the first specific capacitance value is a 16 fF capacitor and the capacitor having the second specific capacitance value is a 32 fF capacitor. As in the example shown in FIG. 7, the capacitance units CM0 to CM3 are 16 fF capacitors having the first specific capacitance value.

On the other hand, the capacitance units CM4 to CM7 include capacitors having a second specific capacitance value of 32 fF. The capacitance unit CM4 includes one 32 fF capacitor. The capacitance unit CM5 forms a capacitance of 64 fF by parallel connection of two 32 fF capacitors. The capacitance unit CM6 forms a capacitance of 128 fF by parallel connection of four 32 fF capacitors. The capacitance unit CM7 forms a capacitance of 256 fF by parallel connection of eight 32 fF capacitors.

Figure 11:
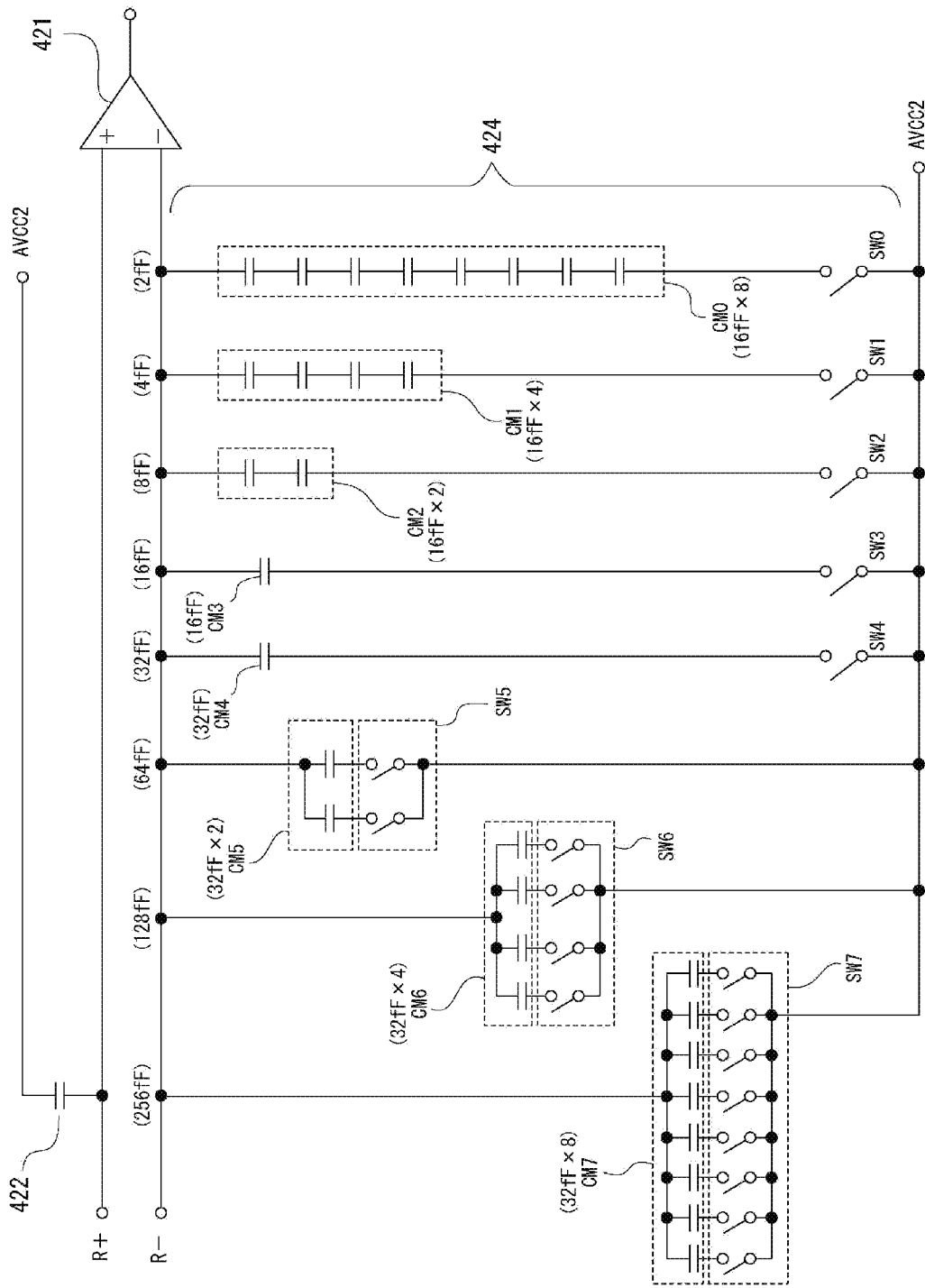
FIG. 11 explains a configuration example III of the capacitor of the measurement capacitance unit according to the embodiment.

In the example shown in FIG. 11, when capacitors are connected in parallel as shown in FIG. 10, switch elements are respectively connected to the capacitors. In other words, in the switches SW5 to SW7 corresponding to the capacitance units CM5 to CM7 shown in FIG. 11, the switch elements are arranged to correspond to the capacitors, respectively. The present disclosure is not limited thereto, and each of the switches SW5 to SW7 may include one switch element corresponding to the capacitance units CM5 to CM7 as shown in FIG. 7.

As shown in FIG. 11, by using the capacitor having the first specific capacitance value and the capacitor having the second specific capacitance value and using the capacitors having small capacitance values (16 fF and 32 fF) as the capacitance units CM0 to CM7, the influence of the capacitance error can be reduced compared to the case where each of the capacitance units CM0 to CM7 includes one capacitor (capacitors having eight different capacitance values). Accordingly, the linearity can be improved. It is merely an example that the capacitors having the first and second specific capacitance values are the 16 fF capacitor and the 32 fF capacitor. Other capacitance values may be adopted.

3-4: Configuration Example IV

A configuration example IV of the measurement capacitance unit 424 will be described with reference to FIG. 12. In this example, capacitor having a first specific capacitance value and a capacitor having a second specific capacitance value are used as the capacitance units CM0 to CM7. The capacitor having the first specific capacitance value is a 16 afF capacitor and the capacitor having the second specific capacitance value is a 128 fF capacitors. Capacitors having capacitance values other than the first and second specific capacitance value are also used.

The capacitance units CM0 to CM3 include capacitors having a first specific capacitance value of 16 fF as in the example shown in FIG. 7. The capacitance unit CM4 includes one 32 fF capacitor. The capacitance unit CM5 includes one 64 fF capacitor. The capacitance unit CM6 includes one capacitor of 128 Ff that is the second specific capacitance value. The capacitance unit CM7 forms a capacitance of 256 fF by parallel connection of two capacitors of 128 fF that is the second specific capacitance value.

By using the series connection of the capacitors having the first specific capacitance value and the parallel connection of the capacitors having the second specific capacitance value, the capacitance units CM0 to CM7 can include capacitors having small capacitance values (16 fF, 128 fF, 32 fF and 64 fF). Therefore, it is possible to reduce the influence of the capacitance error and improve the linearity, compared to when each of the capacitance units CM0 to CM7 includes one capacitor (capacitors having eight different capacitance values).

It is merely an example that the capacitor having the first specific capacitance value is the 16 fF capacitor and the capacitor having the second specific capacitance value is the 128 fF capacitor. Other capacitance values may be adopted. In the example of FIG. 12, when the capacitors are connected in parallel as in the example shown in FIG. 10, the switch elements are respectively connected to the capacitors (the capacitance unit CM7, the switch SW7). The present disclosure is not limited thereto, and the switch SW7 corresponding to the capacitance unit CM7 may include one switch element as shown in FIG. 7.

4. Effects of Embodiments and Modifications

In accordance with the touch panel device 1 or the touch panel driving device 3 of the above embodiment, the following effects can be obtained.

The touch panel driving device 3 (configuration examples I to IV) of the embodiment sequentially performs scanning for selecting a pair of adjacent transmission signal lines 21 and a pair of adjacent reception signal lines 22 on the touch panel 2. The touch panel driving device 3 includes the reception circuit 42 for receiving the reception signals R+ and R− whose waveforms change due to the capacitance change caused by a user's operation from the pair of reception signal lines 22 of the touch panel 2 and generating the detection value (RAW value) for touch panel operation monitoring. The reception circuit 42 generates the RAW value by comparing the levels of the reception signals R− and R+ from one reception signal line and the other reception signal line while sequentially switching the capacitance value of the measurement capacitance unit 424 connected to the one reception signal line. The measurement capacitance unit 424 includes, as the capacitance unit CM forming one capacitance value used for switching the capacitance value of the measurement capacitance unit 424, the capacitance unit CM forming a certain capacitance value by parallel connection or series connection of a plurality of capacitors. By using the parallel connection or the series connection of the capacitors, it is possible to reduce the number of types of capacitors in the measurement capacitance unit 424. This is because capacitance units having various capacitance values can be formed by using a capacitor having a certain capacitance value. Therefore, the influence of the capacitance errors of the capacitors is suppressed, and the linearity of the capacitance transmitted from the measurement capacitance unit 424 to the reception signal line 22 at each level is improved. Accordingly, the sensing accuracy of the touch panel can be improved, and the reproducibility or the accuracy of the coordinates as the operation position can be improved.

In the touch panel driving device 3 including the measurement capacitance unit 424 having the configuration examples I and II of the above embodiment, all the capacitance units CM of the measurement capacitance unit 424 are capacitors having specific capacitance values (e.g., 16 fF). By using a capacitor having a specific capacitance value as the capacitors having various capacitance values in the measurement capacitance unit 424, the capacitance error between the capacitors can become uniform. As described above, the capacitance of the capacitor in the IC depends on the film thickness, the area, and the peripheral length. Since it is considered that the film thickness affecting the capacitor is the same in the same IC, the area or the peripheral length affects the capacitance variation in the capacitors. The degree of influence of the finished dimension error varies depending on the capacitance. In other words, when the capacitance is the same, the capacitance error due to the variation in the finished dimensions is uniform. Thus, in accordance with this configuration, the capacitance values of the capacitors of the measurement capacitor unit 424 have the same error. Therefore, in the capacitances of 256 levels controlled by the capacitance set value of 8 bits, the reverse of the capacitance values does not occur or hardly occurs. Accordingly, the linearity of the measurement capacitance unit 424 is improved, and the accuracy of the RAW value is ensured. As a result, the accuracy of the information on the operation position coordinates which is required by the MCU 5 is improved, and the highly accurate operation detection information can be provided to the product side MCU 90.

In the measurement capacitance unit 424 of the configuration examples I and II of the embodiment, the capacitance unit having a capacitance value greater than a specific capacitance value among the first capacitance unit to the X-th capacitance unit has a configuration in which a plurality of capacitors having the specific capacitance value is connected in parallel. For example, the capacitance units CM4 to CM7 are realized by the parallel configuration. Accordingly, the capacitance units CM4 to CM7 can be realized by a capacitor having a specific capacitance value (16 fF).

In the measurement capacitance unit 424 of the configuration examples I and II of the embodiment, the capacitance unit having a capacitance value smaller than the specific capacitance value among the first capacitance unit to the X-th capacitance unit has a configuration in which a plurality of capacitors having a specific capacitance value is connected in series. For example, the capacitance units CM0 to CM3 are realized by the series configuration. Accordingly, the capacitance units CM0 to CM3 can be realized by a capacitor having a specific capacitance value (16 fF). The number of required capacitors can be reduced by using a 16 fF capacitor for the capacitance units CM0 to CM7 of 2 fF to 256 fF as shown in FIG. 7. For example, in the case of a 2 fF capacitor, 128 capacitors are connected in parallel to obtain 256 fF, and 255 capacitors are required to constitute the capacitance units CM0 to CM7. Even in the case of a 256 fF capacitor, 255 capacitors are required to constitute the capacitance units CM0 to CM7. On the other hand, in the case of a 16 fF (or 32 fF) capacitor, the capacitance units CM0 to CM7 can be realized by 45 capacitors. In other words, by using a capacitor having an average capacitance value among the capacitance units CM0 to CM7, the number of required capacitors can be reduced, which is advantageous in IC design. The area of one capacitor is smaller in the case of using a 16 fF capacitor than in the case of using a 32 fF capacitor. Therefore, when there are two types of capacitors having the average capacitance, the smaller capacitance is advantageous in terms of the area in the IC layout. It is difficult to accurately manufacture a capacitor having an extremely small capacitance of fF order as in the embodiment, particularly, a capacitor of 2 fF. By using a capacitor having an average capacitance, instead of a capacitor having a minimum capacitance, as the capacitance units CM0 to CM7, it is possible to ensure the stability of the production and improve the quality.

Figure 12:
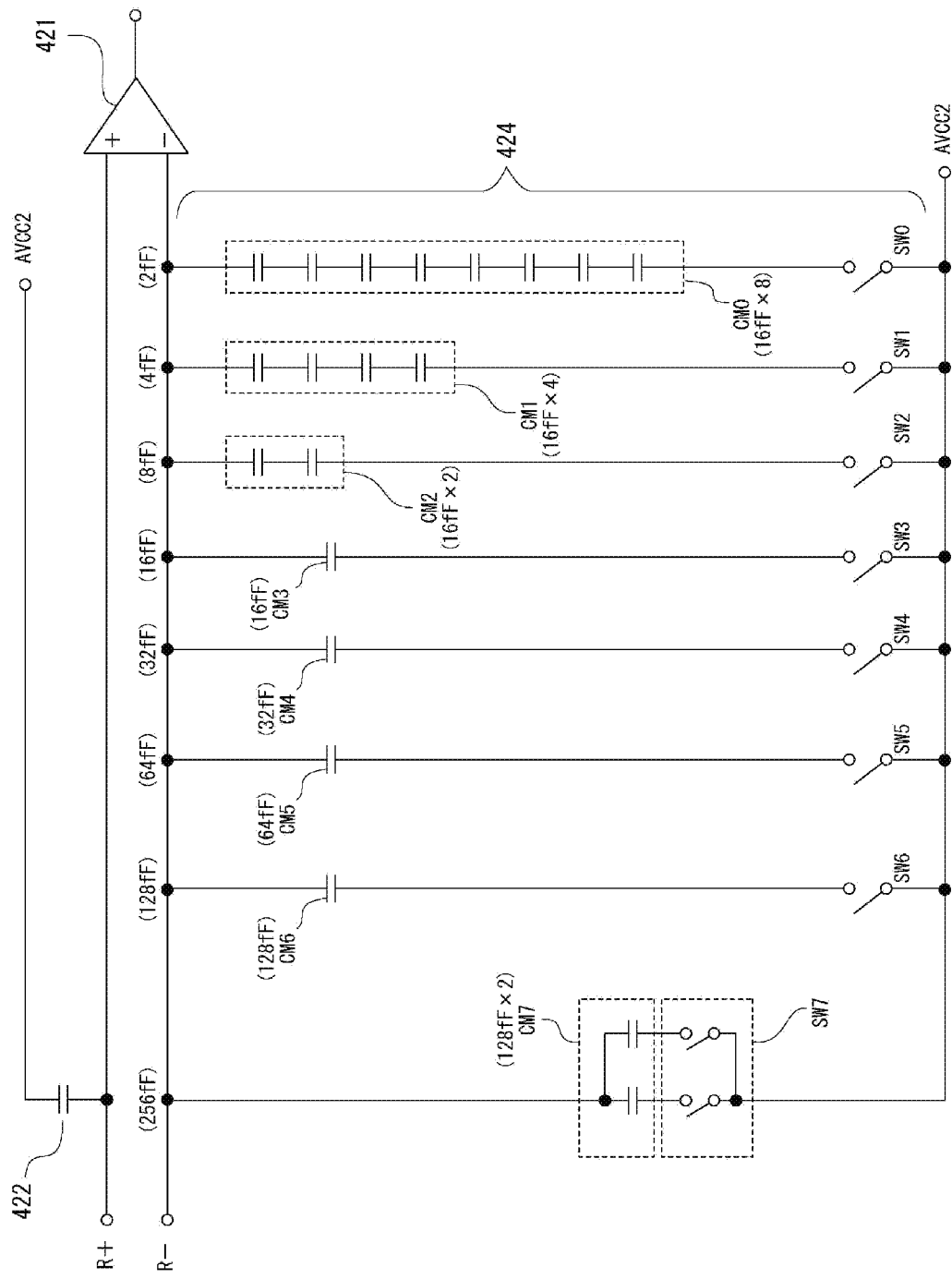
FIG. 12 explains a configuration example IV of the capacitor of the measurement capacitance unit according to the embodiment.

The measurement capacitance unit 424 of the configuration examples III and IV of the embodiment includes: the capacitance units (the capacitance units CM0 TO CM3 shown in FIGS. 11 and 12) having a capacitance value smaller than the first specific capacitance value by series connection of the capacitors having the first specific capacitance value; the capacitance units (the capacitance units CM5 to CM7 shown in FIG. 11) having a capacitance value greater than the second specific capacitance value by parallel connection of the capacitors having the second specific capacitance value; and the capacitance unit CM7 of FIG. 12. In other words, by using two capacitors having specific capacitance values, i.e., the capacitor having a small capacitance value and the capacitor having a large capacitance value, the number of types of capacitors in the measurement capacitance unit 424 can be reduced. Accordingly, the influence of the capacitance errors of the capacitors is suppressed, and the linearity of the capacitance at each level which is transmitted from the measurement capacitance unit 424 to the reception signal line 22 is improved.

In the embodiment (configuration examples I to IV), the measurement capacitance unit 424 includes a plurality of capacitance units from the first capacitance unit (CM0) to the X-th capacitance unit (CM7) which can be connected in parallel to one reception signal line. The connection of the first capacitance unit to the X-th capacitance unit to one reception signal can be individually switched on/off. As described above, since the units CM0 to CM7 are connected in parallel to one of the reception signal lines, the measurement capacitance unit 424 can change the composite capacitance value in multiple levels by selecting the capacitance units CM0 to CM7. Further, since the capacitance errors of the capacitors are uniform, the reversal phenomenon in which the smaller capacitance value becomes greater than the larger capacitance value does not occur in the multiple levels. Therefore, by selecting the first capacitance unit (CM0) to the X-th capacitance unit (CM7), the composite capacitance value with good linearity can be transmitted to the reception signal line 22.

In the measurement capacitance unit 424 of the embodiment (configuration examples I to IV), the capacitance values of the capacitance units from the first capacitance unit to the X-th capacitance unit are set to capacitance values having the relation of powers of 2.

Specifically, in the embodiment, the capacitance values of the capacitance units CM0 to CM7 are capacitance values of $2^1$ to $2^x$ having the relation of ratio of $2^1, 2^2, 2^3 \ldots 2^8$.

Accordingly, the measurement capacitance unit can vary the composite capacitance value in $2^x$ levels by the selection of the capacitance units in the measurement capacitance unit. Since the capacitance errors of the capacitors are uniform, the reversal phenomenon in which the smaller capacitance value becomes greater than the larger capacitance value does not occur in $2^x$ levels. In this case, it is preferable to variably control the capacitance by using the capacitance set value of X bit. For example, each bit is assigned to the ON/OFF control of the switches SW0 to SW7 of the capacitance units CM0 to CM7 by a 8-bit capacitance set value. Accordingly, the capacitance set value itself becomes a value indicating the composite capacitance value of 256 levels which is realized by the selection of the first capacitance unit (CM0) to the X-th capacitance unit (CM7). As described above, the RAW value can be obtained by using the capacitance set value. This is an extremely efficient in the operation process.

In the measurement capacitor unit 424 of the embodiment (configuration examples II to IV), when a plurality of capacitors are connected in parallel in the capacitance unit CM, the switch SW includes the switch elements corresponding to the capacitors. Accordingly, the error in the parasitic capacitance between the wirings between the capacitors and the switch elements can be reduced. With this configuration, the linearity can be improved.

In the embodiment, the improvement of the linearity of the capacitance value of the measurement capacitance unit 424 in 256 levels has been described. However, it is also possible to use a capacitor having the same capacitance value as that of the reference capacitance unit 422 or the measurement capacitance unit 424.

For example, the reference capacitance unit 422 may include one 256 fF capacitor. However, in order to improve the accuracy as a comparison reference, the reference capacitance unit 422 may include sixteen 16 fF capacitors connected in parallel to form a capacitance of 256 fF.

In the touch panel device 1 according to the embodiment, the touch operation has been described. However, the present disclosure may be realized as a touch panel device corresponding to so-called hover sensing (non-contact proximity operation).

The configurations and the operations of the above embodiment are merely examples. The present disclosure may employ other configurations and operations. The reception circuit 42 and the measurement capacitance unit 424 are not limited to the configurations shown in FIG. 3 or 7.

Although the measurement capacitance unit 424 uses a 16 fF capacitor in the above embodiment, it is also possible to use a 32 fF capacitor or a 8 fF capacitor. Although the capacitance of the capacitance units CM0 to CM7 can vary in 256 levels in the above embodiment, it is also possible to provide a larger number of capacitance units CM and vary the capacitance thereof in multiples levels greater than 256 levels. Alternately, the number of levels of the variable capacitance can be reduced.

While the present disclosure has been shown and described with respect to the embodiments, it will be understood by those skilled in the art that various changes and modifications may be made without departing from the scope of the present disclosure as defined in the following claims.

What is claimed is:

1. A touch panel driving device for sequentially performing scanning for selecting a pair of adjacent transmission signal lines and a pair of adjacent reception signal lines on a touch panel, the device comprising:
    a reception circuit configured to receive reception signals whose waveforms are changed by a capacitance change caused by an operation from the pair of reception signal lines of the touch panel and generate a detection value for monitoring a touch panel operation,
    wherein the reception circuit generates the detection value by comparing levels of the reception signals from one reception signal line and the other reception signal line while sequentially switching capacitance values of a measurement capacitance unit connected to said one reception signal line, and
    the measurement capacitance unit includes a plurality of capacitance units each forming a certain capacitance value by parallel connection or series connection of a plurality of capacitors as a capacitance unit forming one capacitance value used for switching the capacitance value of the measurement capacitance unit.

2. The touch panel driving device of claim 1, wherein in the measurement capacitance unit, all the capacitance units includes capacitors having a specific capacitance value.

3. The touch panel driving device of claim 2, wherein a capacitance unit having a capacitance value greater than the specific capacitance value in the measurement capacitance unit is formed by parallel connection of a plurality of capacitors having the specific capacitance value.

4. The touch panel driving device of claim 3, wherein the measurement capacitance unit includes as the capacitance units a plurality of capacitance units from a first capacitance unit to an X-th capacitance unit which are connected in parallel to said one reception signal line, X being a natural number of 2 or more,
    the connections of the capacitance units from the first capacitance unit to the X-th capacitance unit to said one reception signal are individually switched on/off by switches corresponding thereto, and
    the switch corresponding to the capacitance unit formed by parallel connection of a plurality of capacitors includes a plurality of switch elements respectively connected to the plurality of capacitors.

5. The touch panel driving device of claim 2, wherein a capacitance unit having a capacitance value smaller than the specific capacitance value in the measurement capacitance unit is formed by series connection of a plurality of capacitors having the specific capacitance value.

6. The touch panel driving device of claim 1, wherein the measurement capacitance unit includes as the capacitance units a plurality of capacitance units from a first capacitance unit to an X-th capacitance unit which are connected in parallel to said one reception signal line, X being a natural number of 2 or more, and the connections of the capacitance units from the first capacitance unit to the X-th capacitance unit to said one reception signal line are independently switched on/off.

7. The touch panel driving device of claim 6, wherein capacitance values of the capacitance units from the first capacitance unit to the X-th capacitance unit in the measurement capacitance unit are capacitance values having the relation of powers of 2.

8. The touch panel driving device of claim 1, wherein the measurement capacitance unit includes the capacitance unit forming a capacitance value smaller than a first specific capacitance value by series connection of capacitors having the first specific capacitance value, and the capacitance unit forming a capacitance value greater than a second specific capacitance value by parallel connection of capacitors having the second specific capacitance value.

9. A touch panel device comprising:
    a touch panel; and
    a touch panel driving device configured to sequentially perform scanning for selecting a pair of adjacent transmission signal lines and a pair of adjacent reception signal lines on the touch panel,
    wherein the touch panel driving device includes a reception circuit configured to receive reception signals whose waveforms are changed by a capacitance change caused by an operation from the pair of reception signal lines of the touch panel and generate a detection value for monitoring a touch panel operation,
    wherein the reception circuit generates the detection value by comparing levels of the reception signals from one reception signal line and the other reception signal line while sequentially switching capacitance values of a measurement capacitance unit connected to said one reception signal line, and
    the measurement capacitance unit includes a capacitance unit forming a certain capacitance value by parallel connection or series connection of a plurality of capacitors as a capacitance unit forming one capacitance value used for switching the capacitance value of the measurement capacitance unit.

* * * * *